United States Patent [19]
Ellis et al.

[11] 3,796,521
[45] Mar. 12, 1974

[54] COMPRESSOR WITH MOTOR AIR GAP ADJUSTMENT

[75] Inventors: Charles B. Ellis, Forth Worth; Richard E. Cawley, Hurst, both of Tex.

[73] Assignee: Lennox Industries Inc., Marshalltown, Iowa

[22] Filed: Sept. 3, 1971

[21] Appl. No.: 177,677

[52] U.S. Cl. ............................................. 417/415
[51] Int. Cl. ............................................ F04b 35/04
[58] Field of Search ............... 310/90; 417/415, 902

[56] References Cited
UNITED STATES PATENTS

| | | | |
|---|---|---|---|
| 868,580 | 10/1907 | Pomeroy | 310/90 |
| 1,327,160 | 1/1920 | Hurtig | 310/90 |
| 1,597,453 | 8/1926 | Merrill | 310/90 |
| 2,075,893 | 4/1937 | Farrand | 310/90 |
| 2,130,276 | 9/1938 | Hornaday | 417/902 |
| 2,364,038 | 11/1944 | Touborg | 417/415 |
| 2,517,367 | 8/1950 | Winkler | 417/902 |
| 2,740,578 | 4/1956 | Benson | 417/415 |
| 3,171,588 | 3/1965 | Ayling | 417/902 |
| 3,272,426 | 9/1966 | Parker | 417/902 |
| 3,666,380 | 5/1972 | Ellis | 417/902 |

*Primary Examiner*—William L. Freeh
*Attorney, Agent, or Firm*—Molinare, Allegretti, Newitt & Witcoff

[57] ABSTRACT

A refrigerant compressor incorporating an electric motor for rotating a drive shaft journalled within a compressor block of the compressor, the electric motor including a stator secured to the compressor block and a rotor secured to the drive shaft and inductively coupled to the stator. The stator is adjustably connected to the compressor block so as to permit relative adjustment of the stator and rotor to effect desired adjustment of the air gap between the stator and the rotor.

5 Claims, 3 Drawing Figures

INVENTORS:
CHARLES B. ELLIS
RICHARD E. CAWLEY
BY: Molinare, Allegretti, Newitt & Witcoff
ATT'YS

INVENTORS:
CHARLES B. ELLIS
RICHARD E. CAWLEY

BY: Molinare, Allegretti, Newitt & Witcoff
ATT'YS 3,796,521

COMPRESSOR WITH MOTOR AIR GAP ADJUSTMENT

BACKGROUND OF THE INVENTION

This invention relates to a refrigerant compressor and more particularly to a refrigerant compressor incorporating an electric drive motor and including novel means for adjusting the air gap between the stator and the rotor.

In prior refrigerant compressors of the type embodying a compressor block having a drive shaft journalled therein for actuating pistons and a electric motor for rotating the drive shaft, the compressor block was provided with an outwardly extending annular portion for receiving the stator of the electric motor. There were no means for adjusting the air gap between the stator fixed in the compressor block and the rotor of the electric motor which was secured to the drive shaft. If the interior of the annular portion were not machined properly such that the stator contacted the rotor when the parts were assembled, for example, by virtue of offset of the stator axis relative to the axis of the rotor, then its was necessary to scrap the compressor block. In the event there was insufficient air gap and possibly contact of the stator and rotor, a significantly higher starting torque would be required to start rotation of the rotor relative to the stator. Should there be friction resulting between the stator and rotor, the motor could overheat and be damaged. Proper adjustement of the air gap, therefore, is necessary for proper operation of the electric drive motor. In the past, adjustment of the rotor relative to the stator was not provided for and when it was necessary to scrap the entire compressor block. This was an expensive and wasteful procedure.

An object of the present invention is to provide a refrigerant compressor with novel means for adjusting the air gap between the rotor and the stator of the electric drive motor therein, the rotor being secured to the compressor drive shaft and the stator being secured to the compressor block.

Another object of the present invention is to provide a refrigerant compressor with a compressor block having segmental portions extending from the compressor block, with novel adjustment means for securing the stator of the electric drive motor to the segmental portions, the rotor being secured to the drive shaft journalled in the compressor block, relative adjustment of the stator in regard to the rotor effecting adjustment of the air gap between the stator and the rotor, Other objects and advantages of this invention will be made more apparent hereinafter.

BRIEF DESCRIPTION OF THE DRAWINGS

There is shown in the attached drawing a presently preferred embodiment of the present invention wherein:

Referring to FIG. 1, there is illustrated a refrigerant compressor 10 embodying the present invention. The compressor 10 comprises a gas-tight housing or outer casing including an upper shell 12 and a lower shell 14 integrally joined to one another as, for example, by welding. A plurality of legs or supports may be welded to the exterior surface of the lower shell 14 in order to support the compressor in an upright position in an air-conditioning unit or in a condensing unit.

Figure 1:
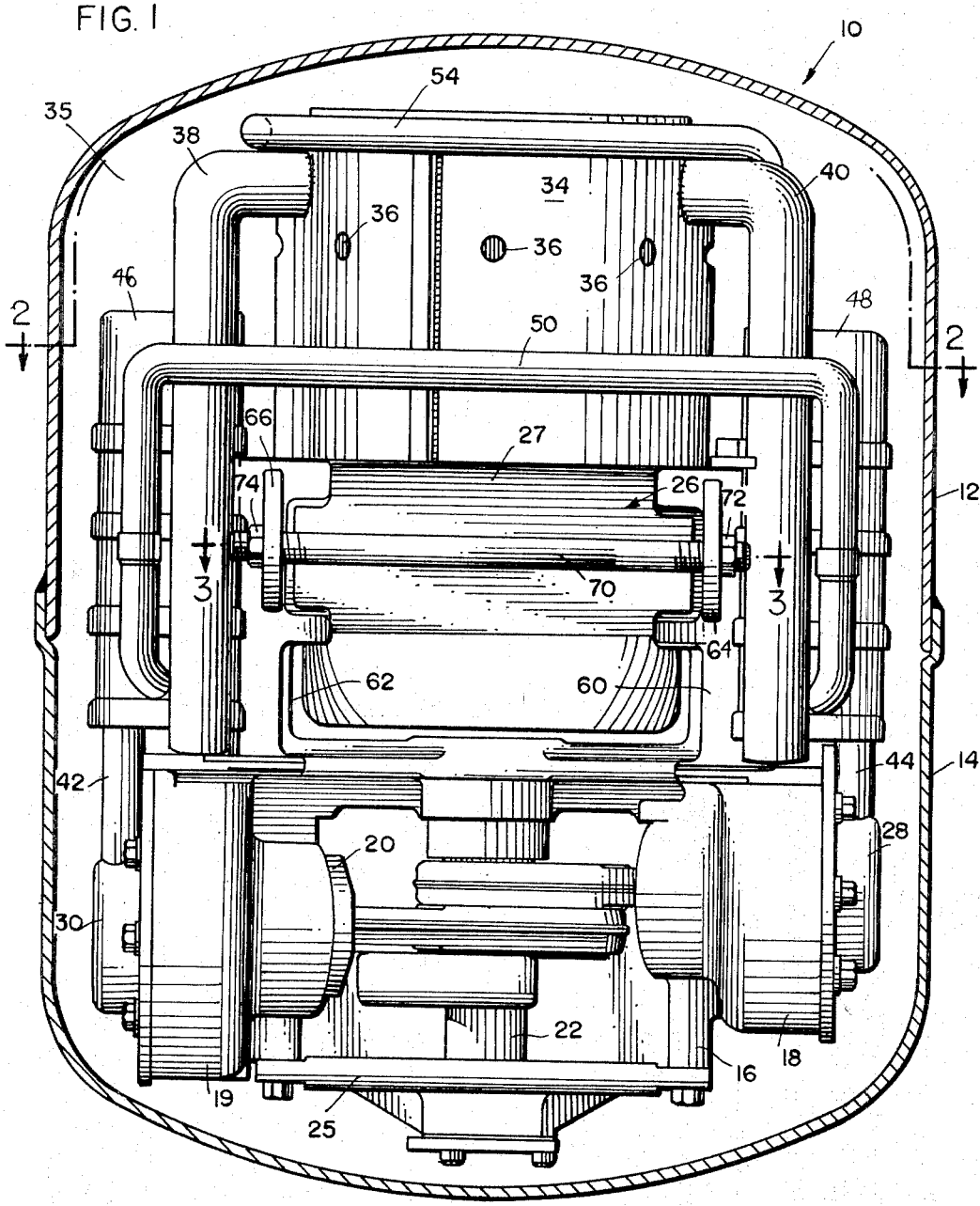
FIG. 1 is an elevational view of a refrigerant compressor embodying principles of the present invention, with the outer casing being cut away so as to better illustrate the interior arrangement of components of the compressor.

Disposed within the housing or outer casing of the compressor 10 is a compressor block 16 which comprises portions defining cylinders 18 and 19 for receiving movable pistons 20 therein. Journalled in the compressor block 16 in an upright position as viewed in FIG. 1 is a drive shaft 22 which is operatively coupled via eccentric portions to the pistons 20 for actuating the pistons. The compressor block 16 includes a base 25 having a central bearing portion that journals the lower end of drive shaft or crankshaft 22.

An electric drive motor 26 secured to the compressor block 16 by means which will be more fully described hereinafter operatively drives the drive shaft 22.

Though a two-cylinder compressor is illustrated, it will be understood that principles of the invention can be adapted to other compressor configurations.

Provided in the end of each cylinder 18 and 19 is a suitable valve assembly incorporating suction valves and discharge valves operable in a conventional fashion. End caps 28 and 30 suitably joined to the ends of the cylinders 18 and 19, for example by bolts, close the cylinders 18 and 19, respectively, and retain the valve assemblies in place.

A suction conduit (not shown) communicates with the outer casing of compressor 10 for returning vaporous refrigerant from the refrigeration system to the compressor 10. Refrigerant entering the outer housing or casing of the compressor 10 from the refrigeration system passes into the annular space between the compressor block 16 and electric motor 26 and the interior of the outer casing. From the annular space 35 refrigerant passes through suitable openings 36 in the sides and top of shroud 34 into the space between the shroud or cover 34 and the electric motor.

From the space between the shroud 34 and the top of an electric motor, the refrigerant passes through the conduits 38 and 40, respectively, to the cylinders 18 and 29. Refrigerant compressed within the cylinders then passes through the conduits 42 and 44 and the mufflers 46 and 48, respectively. The mufflers are interconnected by a conduit 50 to communicate compressed gases from the muffler 46 to the muffler 48. Extending from the muffler 48 is a discharge line 54 which communicates the compressed gases from the compressor to a refrigeration system.

A feature of this invention is the manner of constructing the compressor block 16 so as to adjustably support the stator of an electric drive motor relative to the rotor of said motor. The compressor block 16 includes a pair of segmental portions 60, 62 extending upwardly from the main body thereof. These segmental portions 60, 62 are adapted to conform inwardly to the external configuration of the stator 27 of the electric drive motor 26. Elongated adjustment bolts 70 are secured between flanges 64 and 66 extending from the segmental portions 60 and 62, respectively. The ends of the elongated bolts are threaded and adjustment nuts 72, 74 are secured thereon for selectively adjusting the effective length of the bolt 70 to adjust the position of the stator within the upright segmental portions 60 and 62. The position of the drive shaft 22 and the rotor 25 carried thereon is fixed within the compressor block. It is desired that the stator 27 be adjusted concentric with respect to the axis of the drive shaft 22, whereby the air gap, designed g, between the exterior of the rotor and the interior of the stator will be uniform. Thus, movement of the stator about the axis of the drive shaft will effect adjustment of the air gap between the stator and rotor.

Figure 3:
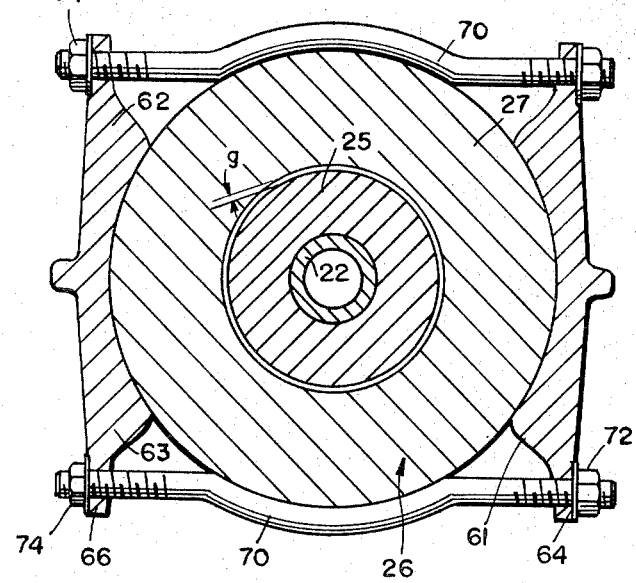
FIG. 3 is a detail cross-sectional view of the refrigerant compressor taken generally along the line 3—3 and better illustrating the disposition of the adjustment bolts utilized to adjust the relative positions of the stator and rotor of the electric drive motor.

Turning to FIG. 3, the adjustment of the air gap between the stator 27 and the rotor 25 of the electric motor may be better understood. To effect adjustment, the shroud 34 is removed and the person effecting the adjustment utilizes a spacer tool of desired thickness disposed in the air gap between the rotor and the stator. If the operator is able to move through 360° with light contact, then there is a proper air gap between the rotor 25 and the stator 27. In the event that the tool cannot pass through 360°, it can be assumed that there is insufficient air gap or improper air gap and it is necessary to effect adjustment. This is done by tightening or loosening selected nuts 72 or 74 on bolts 70 to effect relative positioning of the stator on the compressor block 16 relative to the rotor. After adjustment, each nut can be staked or otherwise fixed relative to the bolt to which it is connected.

Figure 2:
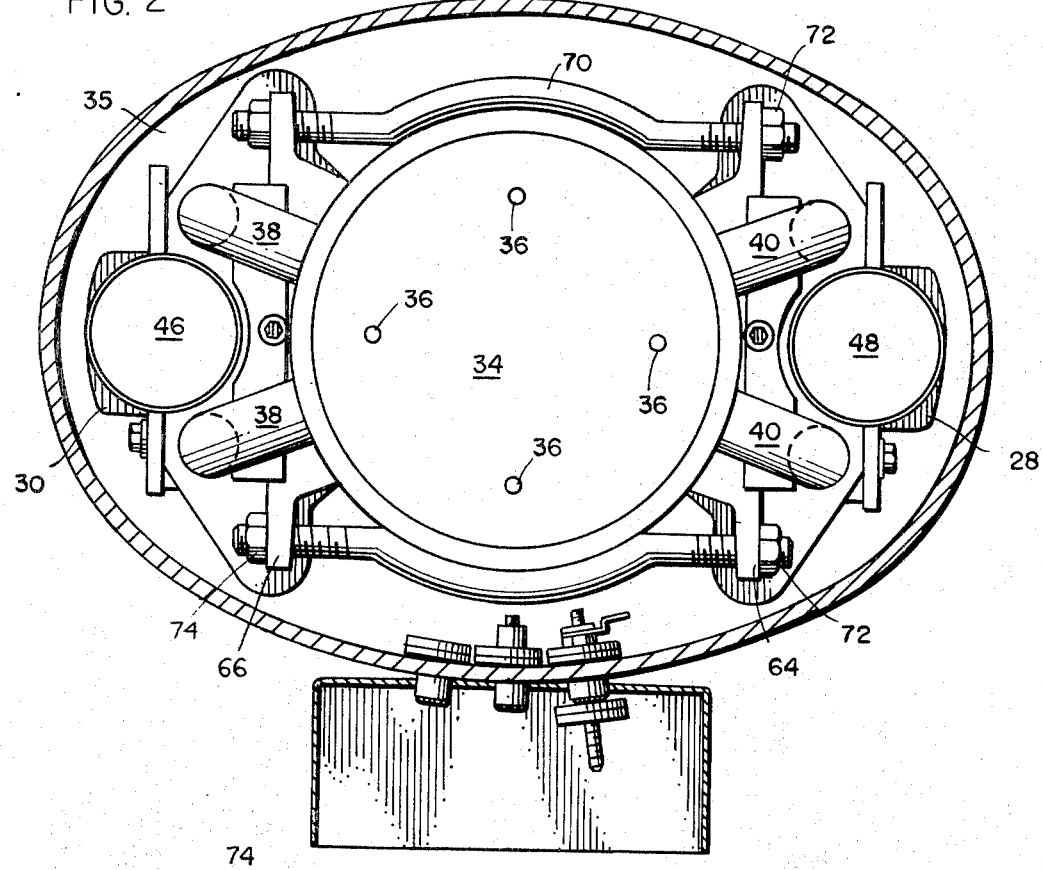
FIG. 2 is a cross-sectional view of the refrigerant compressor of FIG. 1 taken generally along the line 2—2 of FIG. 1.

FIGS. 2 and 3 best show the cross-sectional configuration of the segmental portions 60 and 62. It is seen that each segmental portion incorporates a portion 61, 63 respectively, having an internal configuration complementary to the stator and in abutment with the stator. The flanges 64 and 66 project from the ends of the segmental portions 60 and 62 and are provided with openings therein through which may be passed the ends of the elongated bolts 70. The intermediate portion of the bolts 70 are preferably of an internal cross-sectional configuration conforming to the exterior circular surface of the stator 27.

The present invention can be adapted for compressors having other cylinder configurations; for example, a three-cylinder compressor. In addition, it is possible to utilize certain principles of the present invention in conjunction with a single cylinder compressor having only a single upstanding segmental portion. In the case of a single cylinder compressor having but a single segmental portion, adjustment could be effected by shimming between the interior surface of the portion 61 of an upstanding segmental portion 60. Instead of a pair of bolts in opposite upstanding portions as shown in the illustrated form of the invention, the stator could be encircled by a band or like fastening means.

There has been provided by the present invention a refrigerant compressor having novel means for mounting the stator thereon so as to readily effect adjustment of the stator relative to the rotor to effect adjustment of the air gap between the stator and the rotor.

While a presently preferred embodiment of the invention has been disclosed, it will be obvious to those skilled in the art that various changes and modifications may be made therein without departing from the invention and, therefore, it is intended in the appended claims to cover all such changes and modifications as fall within the true spirit and scope of this invention.

We claim:

1. In a refrigerant compressor of the type including a compressor block, cylinder and piston means in said compressor block, a drive shaft rotatably supported in said compressor block, and operatively connected to said piston means for actuating same, and an electric motor for rotating said drive shaft, said electric motor including a stator fixed relative to the compressor block and a rotor secured to the drive shaft, the improvement characterized by the compressor block having at least two upstanding segmental portions extending therefrom, said stator being secured between said upstanding segmental portions by adjustable means to permit relative adjustment of the stator and rotor to effect adjustment of the air gap between the stator and the rotor, said adjustable means comprising bolt means connected to the segmental portions, and extending along opposed outer surfaces of the stator.

2. In a refrigerant compressor of the type including a compressor block, cylinder and piston means in said compressor block, a drive shaft rotatably supported in said compressor block, and operatively connected to said piston means for actuating same, and an electric motor for rotating said drive shaft, said electric motor including a stator fixed relative to the compressor block and a rotor secured to the drive shaft, the improvement characterized by the compressor block having at least two upstanding segmental portions extending therefrom, said stator being secured between said upstanding segmental portions by adjustable means to permit relative adjustment of the stator and rotor to effect adjustment of the air gap between the stator and the rotor, said adjustable means comprising bolt means connected to the segmental portions, said two segmental portions being disposed on opposite sides of the stator, and said bolt means being on opposite sides of said stator along the outer surface thereof.

3. A refrigerant compressor as in claim 2 wherein the adjustable means include nuts on the bolt means for vayring the tension of same.

4. A refrigerant compressor as in claim 3 wherein the segmental portions have openings therein, the bolt means comprising spaced-apart bolts encompassing the stator, each bolt having a threaded end extending through an opening in a segmental portion, a nut being threaded on said end of each bolt for securing same in place.

5. A refrigerant compressor as in claim 4 wherein each end of the bolts is threaded, said threaded ends extending through openings in opposite segmental portions and nuts on the threaded ends of the bolts for securing same, the nuts being adjustable on the bolts to effect adjustment of the air gap between the stator and rotor.

* * * * *